(12) United States Patent
Xu

(10) Patent No.: US 10,305,665 B2
(45) Date of Patent: May 28, 2019

(54) ABS PROPORTION ADJUSTMENT METHOD AND DEVICE

(71) Applicant: ZTE Corporation, Shenzhen (CN)

(72) Inventor: Hairong Xu, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 49 days.

(21) Appl. No.: 15/513,745

(22) PCT Filed: Feb. 25, 2015

(86) PCT No.: PCT/CN2015/073272
§ 371 (c)(1),
(2) Date: Mar. 23, 2017

(87) PCT Pub. No.: WO2016/045312
PCT Pub. Date: Mar. 31, 2016

(65) Prior Publication Data
US 2017/0288840 A1    Oct. 5, 2017

(30) Foreign Application Priority Data
Sep. 24, 2014    (CN) .......................... 2014 1 0495787

(51) Int. Cl.
*H04B 7/00*    (2006.01)
*H04L 5/00*    (2006.01)
(Continued)

(52) U.S. Cl.
CPC ........... *H04L 5/0073* (2013.01); *H04W 16/32* (2013.01); *H04W 72/0426* (2013.01);
(Continued)

(58) Field of Classification Search
CPC ..... H04W 16/24; H04W 16/32; H04W 24/04; H04W 28/0268; H04W 28/0289; H04W 84/045
(Continued)

(56) References Cited

U.S. PATENT DOCUMENTS 8,594,672 B2 * 11/2013 Agrawal ........... H04W 36/0083
370/331
8,989,157 B2 * 3/2015 Ishida ................. H04W 72/082
370/336
(Continued)

FOREIGN PATENT DOCUMENTS

CN    103391581 A    11/2013
CN    103796239 A    5/2014
(Continued)

OTHER PUBLICATIONS

International Search Report for corresponding application No. PCT/CN2015/073272 filed on Feb. 25, 2015; dated Jun. 19, 2015.
(Continued)

*Primary Examiner* — Dmitry Levitan
(74) *Attorney, Agent, or Firm* — Cantor Colburn LLP

(57) ABSTRACT

An ABS proportion adjustment method and device are provided. In the ABS proportion adjustment method, a macro cell receives the number of interfered UEs and an Almost Blank Subframe (ABS) utilization rate from a micro cell in a coverage of the macro cell; and the macro cell adjusts an ABS proportion according to load information of the macro cell, the number of the interfered UEs under the micro cell and the ABS utilization rate, wherein the load information comprises a Guaranteed Bit Rate Physical Resource Block (GBR PRB) utilization rate and a Guaranteed Bit Rate Downlink Physical Resource Block (GBR DL PRB) utilization rate, and the ABS proportion is a ratio of the
(Continued)

number of ABSs in an ABS pattern period to a total number of downlink subframes in the ABS pattern period.

16 Claims, 4 Drawing Sheets

(51) Int. Cl.
 H04W 72/08 (2009.01)
 H04W 16/32 (2009.01)
 H04W 72/04 (2009.01)
 H04W 88/02 (2009.01)
 H04W 84/04 (2009.01)
 H04W 92/20 (2009.01)

(52) U.S. Cl.
 CPC .......... *H04W 72/08* (2013.01); *H04W 72/082* (2013.01); *H04W 84/045* (2013.01); *H04W 88/02* (2013.01); *H04W 92/20* (2013.01)

(58) Field of Classification Search
 USPC ................ 370/310, 328, 329, 349, 431, 437
 See application file for complete search history.

(56) References Cited

U.S. PATENT DOCUMENTS

| | | | | |
|---|---|---|---|---|
| 9,325,467 | B2* | 4/2016 | Borst | H04L 5/0035 |
| 9,426,804 | B2* | 8/2016 | Ohta | H04W 16/04 |
| 9,642,135 | B2* | 5/2017 | Zhang | H04W 72/1226 |
| 2012/0207025 | A1 | 8/2012 | Barbieri | |
| 2013/0044704 | A1 | 2/2013 | Pang | |
| 2015/0208410 | A1* | 7/2015 | Koutsimanis | H04W 24/10 370/252 |
| 2015/0245233 | A1* | 8/2015 | Ko | H04W 24/04 370/252 |
| 2015/0249530 | A1* | 9/2015 | Zhang | H04L 5/0058 370/329 |
| 2016/0066334 | A1* | 3/2016 | Jin | H04W 72/082 370/252 |
| 2016/0353451 | A1* | 12/2016 | Ko | H04W 16/04 |
| 2017/0222773 | A1* | 8/2017 | Sen | H04L 5/0032 |

FOREIGN PATENT DOCUMENTS

| | | |
|---|---|---|
| CN | 103931256 A | 7/2014 |
| WO | 2014021762 A1 | 7/2013 |
| WO | 2013115037 A1 | 8/2013 |

OTHER PUBLICATIONS

Alcatel-Lucent, et Al: ABS Status Reporting in Rel-10", 3GPP TSG RAN WG3 Meeting #71, Taipei Taiwan," Feb. 15, 2011, XP050497734 R3-110850.

European Search Report for corresponding application EP15844615; Report dated Sep. 8, 2017.

* cited by examiner

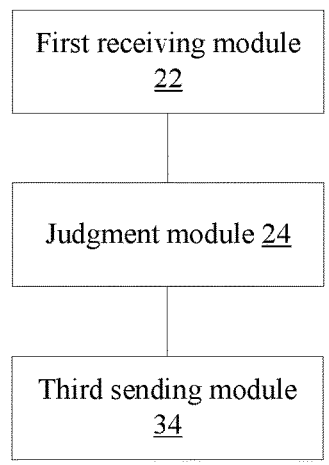
Fig. 4
| HeNB | | | UE interfered by MeNB | | | | UE interfered by MeNB | |
|---|---|---|---|---|---|---|---|---|
| MeNB | | | ABS | | | | ABS | |
Fig. 5
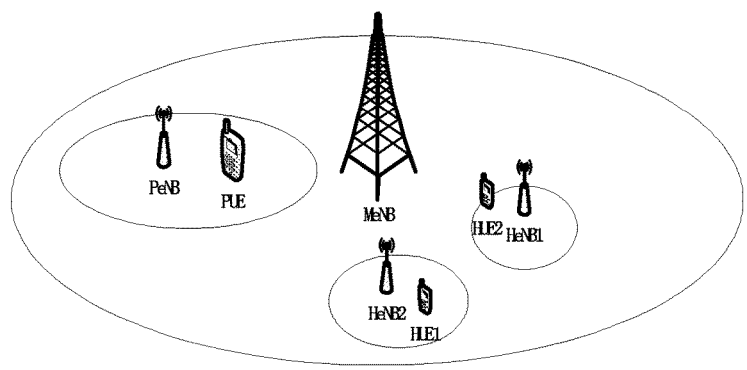
Fig. 6

ABS PROPORTION ADJUSTMENT METHOD AND DEVICE

TECHNICAL FIELD

The present disclosure relates to the field of communications, and in particular to an Almost Blank Subframe (ABS) proportion adjustment method and device.

BACKGROUND

An Enhanced Inter-Cell Interference Coordination (eICIC) technology is mainly applicable to heterogeneous networks. Traditional macro cell networks have characteristics such as focusing on outdoor and despising indoor, focusing on networking and despising hotspot. In the traditional macro cell networks, insufficient consideration is given to increasingly developing applications of hotspot users. Taking the above factor into consideration, it is needed to add low-power nodes in a macro cell. These low-power nodes may include pico, femto, relay and so on and these low-power nodes together form a heterogeneous network. Some new interference scenarios are introduced into the heterogeneous network. How to provide high-quality services in these interference scenarios as far as possible is a topic commonly concerned by operators and equipment manufacturers.

The 3rd Generation Partnership Project (3GPP) organization carries out a research on the solution to interference existing in heterogeneous networks. At present, relatively mature solutions include an ABS technology and a micro cell (specifically, a micro base station which is usually referred to as HeNB) automatic power adjustment technology.

The ABS technology is a technology in which only CRS, neither a control channel nor data, is sent in a frame (except special conditions) when this frame is configured as an ABS frame, so that other cells will suffer a relatively small interference when sending data in this subframe. It can be seen that the core idea of the ABS technology is that a macro cell configures an ABS subframe and relevant micro cells schedules data in this subframe, so as to reduce the interference. As shown in accompanying drawings, the macro cell (specifically, a macro base station which is usually referred to as MeNB) has interference on UE under the HeNB, under such a circumstance, an ABS is configured on the MeNB, and the HeNB schedules all UEs interfered by the MeNB on the corresponding subframe, so that the degree of the interference suffered by these UEs can be reduced.

In Long Term Evolution (LTE), micro cells report load information and ABS utilization rate to a macro cell through an X2 interface. The macro cell dynamically adjusts the ABS proportion of the macro cell according to the load information of the macro cell in conjunction with the ABS subframe utilization rate and the load information of all micro cells in the coverage of the macro cell. The macro cell then transmits adjusted ABS subframe information to the micro cells through the X2 interface. After a micro cell receives the ABS subframe information transmitted from the macro cell, the micro cell schedules UEs seriously interfered by the macro cell on the ABS subframe of the macro cell.

In order to improve the utilization rate of Physical Resource Block (PRB), after the micro cell schedules the UEs interfered by the macro cell on the ABS subframe, in the condition that the ABS subframe resource is redundant, the redundant ABS subframe resource may be allocated to UEs not seriously interfered by the macro cell. When this technical scheme is adopted, the ABS subframe utilization rate reported by the micro cell to the macro cell through the X2 interface cannot truly reflect the actual ABS utilization rate. In an extreme condition, the micro cell may have no interfered UE, and the PRBs of the ABS subframe are totally occupied by non-interfered UEs. In another situation, there may be interfered UEs, but these UEs have no service being executed, then the ABS subframe utilization rate is 0, under such a circumstance, the macro cell should not adjust the ABS proportion to 0, so as to ensure that there is an ABS subframe available for these interfered UEs.

In view of the problem in the relevant technologies that the ABS subframe utilization rate reported by the micro cell to the macro cell cannot truly reflect the actual ABS utilization rate, no solution has been put forward so far.

SUMMARY

Some embodiments of the present disclosure provide an ABS proportion adjustment method or device, to at least solve the problem in the related art that the ABS subframe utilization rate reported by a micro cell to a macro cell cannot truly reflect the actual ABS utilization rate.

According to an embodiment of the present disclosure, an ABS proportion adjustment method is provided. The ABS proportion adjustment method includes the following steps. A macro cell receives the number of interfered UEs and an ABS utilization rate from a micro cell in a coverage of the macro cell. The macro cell adjusts an ABS proportion according to load information of the macro cell, the number of the interfered UEs under the micro cell and the ABS utilization rate. In the embodiment, the load information includes a Guaranteed Bit Rate Physical Resource Block (GBR PRB) utilization rate and a Guaranteed Bit Rate Downlink Physical Resource Block (GBR DL PRB) utilization rate, and the ABS proportion is a ratio of the number of ABSs in an ABS pattern period to the total number of downlink subframes in the ABS pattern period.

In an exemplary embodiment, before the macro cell adjusts the ABS proportion according to the load information of the macro cell, the number of the interfered UEs and the ABS utilization rate, the ABS proportion adjustment method may further include the following steps. The macro cell receives an invoke indication request sent by the micro cell. The macro cell judges whether the invoke indication request is received for the first time. When the invoke indication request is received for the first time, the macro cell sends a preconfigured initial value of the ABS proportion to the micro cell. When the invoke indication request is not received for the first time, the macro cell sends a minimum value of the ABS proportion to the micro cell.

In an exemplary embodiment, the step that the macro cell adjusts the ABS proportion according to the load information of the macro cell, the number of the interfered UEs and the ABS utilization rate may be embodied as the following steps. ABS PRB utilization rates and numbers of interfered UEs of all micro cells in the coverage of the macro cell are averaged to obtain an average ABS PRB utilization rate of all the micro cells. When the average ABS PRB utilization rate of all the micro cells is greater than a first threshold and the number of the interfered UEs is greater than 1, the macro cell increases the ABS proportion and records the number M of micro cells needing to add an ABS. When the average ABS PRB utilization rate of all the micro cells is not greater than a second threshold, whether M is equal to 0 is judged. When M is equal to 0, the macro cell adjusts the ABS proportion to 0. When M is not equal to 0 and the GBR DL PRB utilization rate of the macro cell is not greater than the second threshold, the macro cell increases the ABS proportion. When M is not equal to 0 and the GBR DL PRB utilization rate of the macro cell is greater than the second threshold and is less than the first threshold, the macro cell increases the ABS proportion. When the GBR DL PRB utilization rate of the macro cell is not less than the first threshold, and the GBR DL PRB utilization rate of the macro cell is less than a third threshold or the M is greater than a preset threshold, the macro cell increases the ABS proportion.

In an exemplary embodiment, the step that the macro cell receives the number of the interfered UEs and the ABS utilization rate from the micro cell in the coverage of the macro cell may be embodied as the following step. The macro cell receives the ABS utilization rate and the number of the interfered UEs through a resource status update message.

In an exemplary embodiment, after the macro cell adjusts the ABS proportion according to the load information of the macro cell, the number of the interfered UEs under the micro cell and the ABS utilization rate, the ABS proportion adjustment method may further include the following step. The macro cell sends a load message to the micro cell. In this exemplary embodiment, the load message may carry an ABS pattern of the macro cell, the ABS pattern being indicative of the ABS proportion.

According to another embodiment of the present disclosure, an ABS proportion adjustment device is provided, which is applied to a macro cell. The ABS proportion adjustment device includes a first receiving module and an adjustment module. The first receiving module is arranged to receive the number of interfered UEs and an ABS utilization rate from a micro cell in a coverage of the macro cell. The adjustment module is arranged to adjust an ABS proportion according to load information of the macro cell, the number of the interfered UEs under the micro cell and the ABS utilization rate. In this embodiment, the load information includes a GBR PRB utilization rate and a GBR DL PRB utilization rate, and the ABS proportion is a ratio of the number of ABSs in an ABS pattern period to the total number of downlink subframes in the ABS pattern period.

In an exemplary embodiment, the ABS proportion adjustment device may further include a second receiving module, a judgment module, a first sending module and a second sending module. The second receiving module is arranged to receive an invoke indication request sent by the micro cell. The judgment module is arranged to judge whether the invoke indication request is received for the first time. The first sending module is arranged to send, when the invoke indication request is received for the first time, a preconfigured initial value of the ABS proportion to the micro cell. The second sending module is arranged to send, when the invoke indication request is not received for the first time, a minimum value of the ABS proportion to the micro cell.

In an exemplary embodiment, the adjustment module is arranged to: average ABS PRB utilization rates and numbers of interfered UEs of all micro cells in the coverage of the macro cell to obtain an average ABS PRB utilization rate of all the micro cells; when the average ABS PRB utilization rate of all the micro cells is greater than a first threshold and the number of the interfered UEs is greater than 1, the macro cell increases the ABS proportion and record the number M of micro cells needing to add an ABS. The adjustment module is also arranged to: when the average ABS PRB utilization rate of all the micro cells is not greater than a second threshold, judge whether M is equal to 0; when M is equal to 0, adjust the ABS proportion to 0; when M is not equal to 0 and the GBR DL PRB utilization rate of the macro cell is not greater than the second threshold, the macro cell increases the ABS proportion; and, when M is not equal to 0 and the GBR DL PRB utilization rate of the macro cell is greater than the second threshold and is less than the first threshold, increase the ABS proportion. The adjustment module is also arranged to: when the GBR DL PRB utilization rate of the macro cell is not less than the first threshold, and the GBR DL PRB utilization rate of the macro cell is less than a third threshold or the M is greater than a preset threshold, increase the ABS proportion.

In an exemplary embodiment, the first receiving module is arranged to receive the ABS utilization rate and the number of the interfered UEs through a resource status update message.

In an exemplary embodiment, the ABS proportion adjustment device may further include a third sending module. The third sending module is arranged to send a load message to the micro cell. In this exemplary embodiment, the load message carries an ABS pattern of the macro cell, the ABS pattern being indicative of the ABS proportion.

According to the technical solution provided by the embodiments of the present disclosure, the macro cell receives the number of interfered UEs and the ABS utilization rate from a micro cell in a coverage of the macro cell; and the macro cell adjusts the ABS proportion according to load information of the macro cell, the number of the interfered UEs under the micro cell and the ABS utilization rate. The load information includes a GBR PRB utilization rate and a GBR DL PRB utilization rate, and the ABS proportion is a ratio of the number of ABSs in an ABS pattern period to the total number of downlink subframes in the ABS pattern period. The technical solution provided by the embodiments of the present disclosure solves the problem in the related art that the ABS subframe utilization rate reported by micro cells to a macro cell cannot truly reflect the actual ABS utilization rate. The macro cell is enabled to provide an accurate ABS proportion for the micro cells in the coverage of the macro cell.

BRIEF DESCRIPTION OF THE DRAWINGS

For a better understanding of the present disclosure, accompanying drawings described hereinafter are provided to constitute one part of the application; the schematic embodiments of the present disclosure and the description thereof are used to illustrate the present disclosure, not to limit the present disclosure. In the accompanying drawings:

FIG. 4 is a second structure diagram of an ABS proportion adjustment device according to an embodiment of the present disclosure;

FIG. 5 is a diagram illustrating an ABS subframe, and an MeNB and an HeNB adopting the ABS technology according to an embodiment of the present disclosure;

FIG. 6 is a networking diagram of a heterogeneous network in an LTE system according to an embodiment of the present disclosure;

DETAILED DESCRIPTION OF THE EMBODIMENTS

The present disclosure is described below in detail by reference to the accompanying drawings in conjunction with embodiments. It should be noted that the embodiments in the application and the characteristics of the embodiments can be combined if no conflict is caused.

Figure 1:
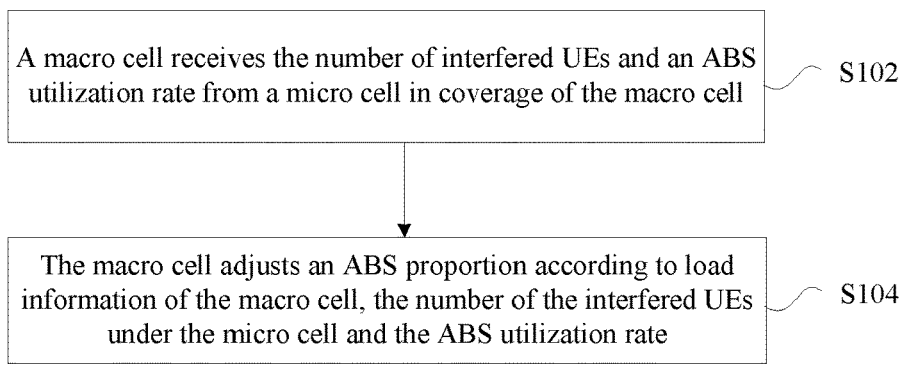
FIG. 1 is a flowchart of an ABS proportion adjustment method according to an embodiment of the present disclosure.

An ABS proportion adjustment method is provided in an embodiment. FIG. 1 is a flowchart of an ABS proportion adjustment method according to the embodiment of the present disclosure. As shown in FIG. 1, the process includes steps as follows.

At step S102, a macro cell receives the number of interfered UEs and an ABS utilization rate from a micro cell in coverage of the macro cell.

At step S104, the macro cell adjusts an ABS proportion according to load information of the macro cell, the number of the interfered UEs under the micro cell and the ABS utilization rate. In this embodiment, the load information includes a GBR PRB utilization rate and a GBR DL PRB utilization rate, and the ABS proportion is a ratio of the number of ABSs in an ABS pattern period to the total number of downlink subframes in the ABS pattern period.

Through the above steps, the basis of the macro cell adjusting the ABS proportion to be provided to the micro cell includes: the load information of the macro cell, the number of the interfered UEs under the micro cell and the ABS utilization rate. In related art, the basis of the macro cell adjusting the ABS proportion to be provided to the micro cell includes: the load condition of the macro cell, the ABS subframe utilization rate and the load information of the micro cell. By additionally using the number of the interfered UEs as one of the basis for the macro cell to adjust the ABS proportion, the above steps solves the problem that the ABS subframe utilization rate reported by the micro cell to the macro cell cannot truly reflect the actual ABS utilization rate. The macro cell is enabled to provide an accurate ABS proportion for micro cells in the coverage of the macro cell.

The implementation of the above steps depends on that the micro cell has already periodically reported its ABS utilization rate and the number of interfered users to the macro cell. When the micro cell has not yet periodically reported the above information to the macro cell, in an exemplary embodiment, before the macro cell adjusts the ABS proportion according to load information of the macro cell, the number of the interfered UEs and the ABS utilization rate, the macro cell may receive an invoke indication request sent by the micro cell. The macro cell judges whether the invoke indication request is received for the first time. When the invoke indication request is received for the first time, the macro cell sends a preconfigured initial value of the ABS proportion to the micro cell. When the invoke indication request is not received for the first time, the macro cell sends a minimum value of the ABS proportion to the micro cell. In this way, it can be guaranteed that the micro cell can acquire an ABS from the macro cell so as to adjust interfered UEs.

The above step S104 involves the processing that the macro cell adjusts the ABS proportion according to the load information of the macro cell, the number of the interfered UEs and the ABS utilization rate. It is should be noted that the macro cell may adjust the ABS proportion according to the above information by many ways. In an exemplary embodiment, the ABS PRB utilization rates and the numbers of the interfered UEs of all micro cells in the coverage of the macro cell are averaged to obtain an average ABS PRB utilization rate of all the micro cells. When the average ABS PRB utilization rate of all the micro cells is greater than a first threshold and the number of the interfered UEs is greater than 1, the macro cell increases the ABS proportion and records the number M of micro cells needing to add an ABS. When the average ABS PRB utilization rate of all the micro cells is not greater than a second threshold, whether M is equal to 0 is judged. When M is equal to 0, the macro cell adjusts the ABS proportion to 0. When M is not equal to 0 and the GBR DL PRB utilization rate of the macro cell is not greater than the second threshold, the macro cell increases the ABS proportion. When M is not equal to 0 and the GBR DL PRB utilization rate of the macro cell is greater than the second threshold and is less than the first threshold, the macro cell increases the ABS proportion. When the GBR DL PRB utilization rate of the macro cell is not less than the first threshold, and the GBR DL PRB utilization rate of the macro cell is less than a third threshold or the M is greater than a preset threshold, the macro cell increases the ABS proportion.

Through this way, the macro cell can dynamically and accurately adjust the ABS proportion.

The macro cell may also receive the number of the interfered UEs and the ABS utilization rate from the micro cell in the coverage of the macro cell by many ways. In an exemplary embodiment, the step that the macro cell receives the number of the interfered UEs and the ABS utilization rate from the micro cell in the coverage of the macro cell may be implemented in the following manner. The macro cell receives the ABS utilization rate and the number of the interfered UEs through a resource status update message. The way that the macro cell receives the number of the interfered UEs and the ABS utilization rate from the micro cell in the coverage of the macro cell may also be flexibly selected according to the actual information interaction condition between the macro cell and the micro cell. In an exemplary embodiment, after the macro cell adjusts the ABS proportion according to the load information of the macro cell, the number of the interfered UEs under the micro cell and the ABS utilization rate, the macro cell sends a load message to the micro cell. The load message may carry an ABS pattern of the macro cell, the ABS pattern being indicative of the ABS proportion.

An ABS proportion adjustment device is provided in another embodiment. This device is arranged to realize the above embodiments and exemplary implementations. What has been described above is not repeated below. Term "module" used below can realize the combination of software and/or hardware with preset functions. Although the device described in the following embodiments preferably is implemented in the form of software, the implementation in the form of hardware or the combination of software and hardware is possible and conceived.

Figure 2:
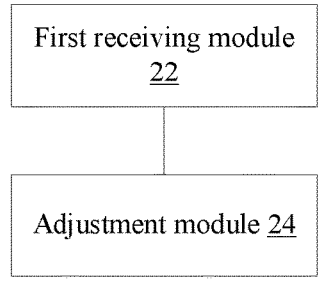
FIG. 2 is a structure diagram of an ABS proportion adjustment device according to an embodiment of the present disclosure.

FIG. 2 is a structure diagram of an ABS proportion adjustment device according to the embodiment of the present disclosure. This ABS proportion adjustment device is applied to a macro cell. As shown in FIG. 2, the ABS proportion adjustment device includes a first receiving module 22 and an adjustment module 24. The first receiving module 22 is arranged to receive the number of interfered UEs and an ABS utilization rate from a micro cell in coverage of the macro cell. The adjustment module 24 is arranged to adjust an ABS proportion according to load information of the macro cell, the number of the interfered UEs under the micro cell and the ABS utilization rate. In this embodiment, the load information includes a GBR PRB utilization rate and a GBR DL PRB utilization rate, and the ABS proportion is a ratio of the number of ABSs in an ABS pattern period to the total number of downlink subframes in the ABS pattern period.

Figure 3:
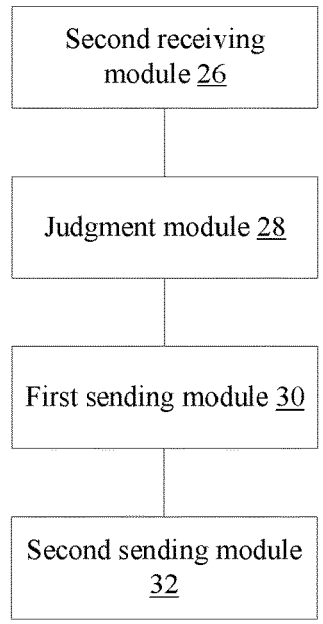
FIG. 3 is a first structure diagram of an ABS proportion adjustment device according to an embodiment of the present disclosure.

FIG. 3 is a first structure diagram of an ABS proportion adjustment device according to an embodiment of the present disclosure. As shown in FIG. 3, the ABS proportion adjustment device may further include a second receiving module 26, a judgment module 28, a first sending module 30 and a second sending module 32. The second receiving module 26 is arranged to receive an invoke indication request sent by the micro cell. The judgment module 28 is arranged to judge whether the invoke indication request is received for the first time. The first sending module 30 is arranged to send, when the invoke indication request is received for the first time, a preconfigured initial value of the ABS proportion to the micro cell. The second sending module 32 is arranged to send, when the invoke indication request is not received for the first time, a minimum value of the ABS proportion to the micro cell.

In an exemplary embodiment, the adjustment module 24 is arranged to: average ABS PRB utilization rates and numbers of interfered UEs of all micro cells in the coverage of the macro cell to obtain an average ABS PRB utilization rate of all the micro cells; when the average ABS PRB utilization rate of all the micro cells is greater than a first threshold and the number of the interfered UEs is greater than 1, increase the ABS proportion and record the number M of micro cells needing to add an ABS. The adjustment module 24 is also arranged to: when the average ABS PRB utilization rate of all the micro cells is not greater than a second threshold, judge whether M is equal to 0; when M is equal to 0, adjust the ABS proportion to 0; when M is not equal to 0 and the GBR DL PRB utilization rate of the macro cell is not greater than the second threshold, increase the ABS proportion; and, when M is not equal to 0 and the GBR DL PRB utilization rate of the macro cell is greater than the second threshold and is less than the first threshold, increase the ABS proportion. The adjustment module 24 is also arranged to: when the GBR DL PRB utilization rate of the macro cell is not less than the first threshold, and the GBR DL PRB utilization rate of the macro cell is less than a third threshold or the M is greater than a preset threshold, increase the ABS proportion.

In an exemplary embodiment, the first receiving module 22 is arranged to receive the ABS utilization rate and the number of the interfered UEs through a resource status update message.

FIG. 4 is a second structure diagram of an ABS proportion adjustment device according to an embodiment of the present disclosure. As shown in FIG. 4, in an exemplary embodiment, the ABS proportion adjustment device may further include a third sending module 34. The third sending module 34 is arranged to send a load message to the micro cell. The load message may carry an ABS pattern of the macro cell, the ABS pattern being indicative of the ABS proportion.

In view of the above technical problem existing in related art, a description is given below in conjunction with exemplary embodiments. The exemplary embodiments may combine the above exemplary embodiments and exemplary implementations.

This exemplary embodiment provides a method for dynamically adjusting the ABS proportion.

In the method for dynamically adjusting the ABS proportion provided by this exemplary embodiment, a micro cell reports the number of interfered UEs and the ABS subframe utilization rate to a macro cell through an X2 interface, and the macro cell can adjust the ABS proportion according to the number of interfered UEs and the ABS subframe utilization of the micro cell and the PRB resource utilization of the macro cell, etc.

The method for dynamically adjusting the ABS proportion provided by this exemplary embodiment includes steps as follows.

At Step 1, a macro cell sends a resource status request message to a micro cell to request for information about an ABS resource utilization rate and the number of interfered UEs.

At Step 2, the micro cell sends an invoke indication request to the macro cell using load information.

At Step 3, the macro cell replies a load information message to the micro cell, the message carrying an initial value of the ABS pattern of the macro cell.

At Step 4, the micro cell periodically reports the information about the ABS utilization rate and the number of interfered UEs of the micro cell to the macro cell through a resource status update message.

At Step 5, the macro cell adjusts the ABS proportion dynamically according to the information about the ABS PRB utilization rate and the number of interfered UEs of the micro cell and the PRB utilization rate of the macro cell.

At Step 6, the macro cell sends an ABS pattern of the macro cell through a load information message to notify the micro cell to change the ABS pattern.

From the above technical scheme it can be seen that the dynamic interference coordinating method and system provided by this exemplary embodiment can effectively solve the present dynamic problem of ABS.

This exemplary embodiment is described below in further detail in conjunction with accompanying drawing.

FIG. 5 is a diagram illustrating an ABS subframe, and an MeNB and an HeNB adopting the ABS technology according to an embodiment of the present disclosure. As shown in FIG. 5, the MeNB reserves part subframes as ABS subframes for UEs of the HeNB which are seriously interfered by the MeNB.

FIG. 6 is a networking diagram of a heterogeneous network in an LTE system according to an embodiment of the present disclosure. As shown in FIG. 6, the drawing displays MeNB, PeNB, HeNB and PUE, HUE. MeNB is a macro cell, PeNB is a PICO cell, HeNB is a femto cell, PeNB and HeNB both belong to micro cells. In the drawing, PeNB and HeNB both are in the coverage of MeNB. The specific implementations of the present disclosure are described below by taking the structure shown in FIG. 6 as an example.

Supposing HUE1 accesses the network from HeNB1, the locating method for mobile stations provided by this exemplary embodiment includes steps as follows.

At Step 1, the macro cell sends a resource status request message to the micro cell to request for ABS status information (information about the ABS resource utilization rate and the number of interfered UEs).

Figure 7:
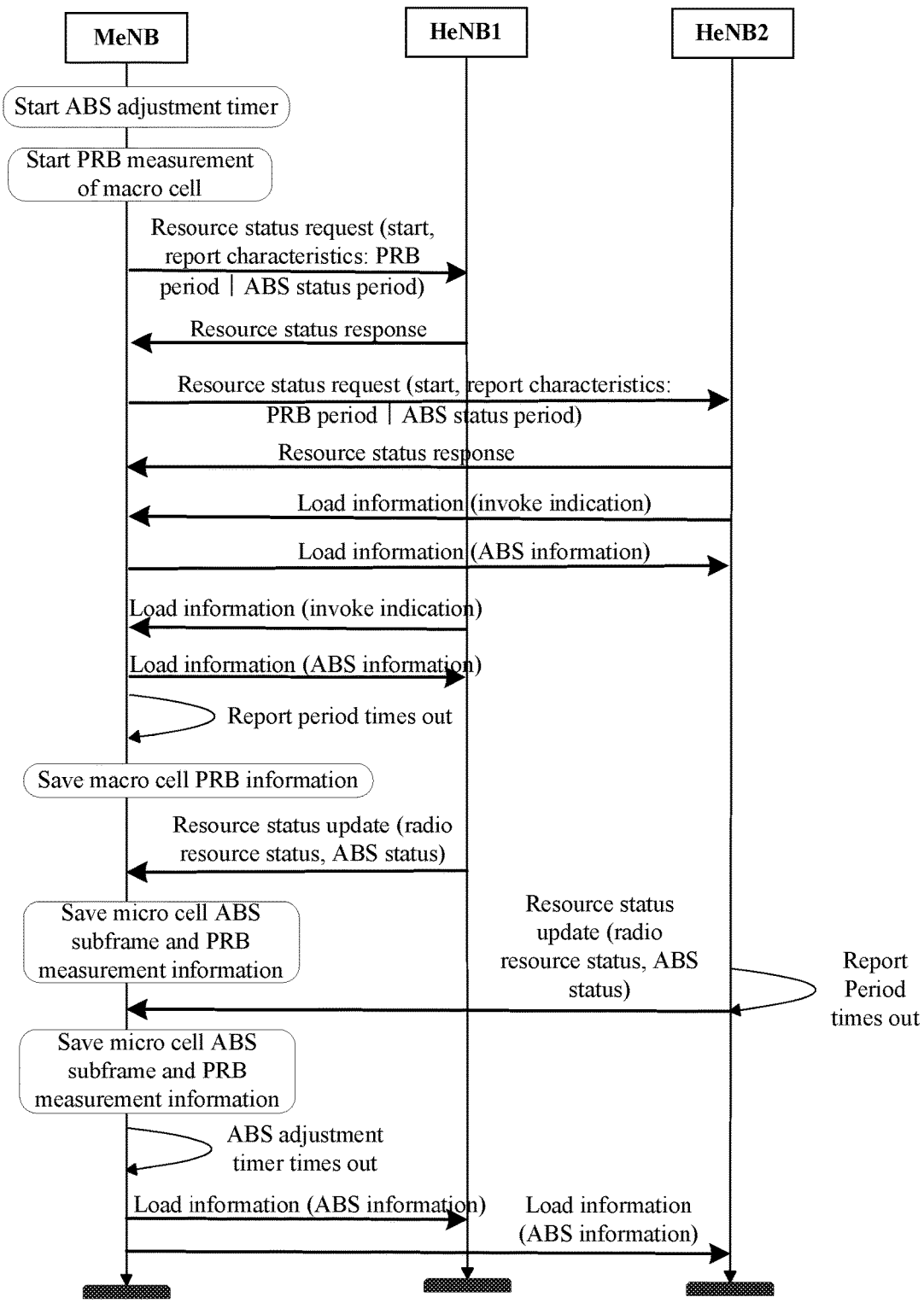
FIG. 7 is a flowchart of message interactions through an X2 interface between a macro cell and a micro cell according to an embodiment of the present disclosure.

FIG. 7 is a flowchart of message interactions through an X2 interface between a macro cell and a micro cell according to an embodiment of the present disclosure. As shown in FIG. 7, when the micro cell is electrified and establishes an X2 interface with the macro cell, the macro cell sends a resource status request message to the micro cell to request for ABS status information (information about the ABS resource utilization rate and the number of interfered UEs). After the micro cell receives the resource status request message, the micro cell replies a resource status response message to the macro cell. Then the micro cell periodically reports the information about the ABS status and the number of UEs interfered by the macro cell to the macro cell.

At Step 2, the micro cell sends an invoke indication request to the macro cell using load information.

Upon establishing an X2 interface with the macro cell, the micro cell sends a load information message to the macro cell immediately, the message carrying an invoke indication request. After the ABS proportion (ABS pattern) is adjusted to zero by the macro cell subsequently, if the number of UEs of the micro cell interfered by the macro cell changes to non zero from zero, the micro cell immediately sends an invoke indication request to the macro cell.

At Step 3, the macro cell replies a load information message to the micro cell, the message carrying an initial value of the ABS pattern configured by the higher layer of the macro cell.

After the macro cell receives the invoke indication request from the micro cell for the first time, the macro cell replies a load information message to the micro cell, the message carrying the initial value of the ABS pattern configured by the higher layer of the macro cell. If the macro cell receives the invoke indication request from the micro cell not for the first time, the macro cell replies a minimum value of the ABS pattern to the micro cell.

At Step 4, the micro cell periodically reports the information about the ABS utilization rate and the number of interfered UEs of the micro cell to the macro cell through a resource status update message.

The micro cell periodically reports the information about the ABS utilization rate and the number of UEs interfered by the macro station to the macro cell through a resource status update message. The macro cell can adjust the ABS pattern used by the micro cell according to the information about the ABS utilization rate and the number of UEs interfered by the macro station. If the ABS utilization rate is zero, but there is a UE interfered by the macro cell, the macro station will not adjust the ABS patter to zero, so as to ensure that the UE of the micro cell interfered by the macro station has an available ABS subframe at any time. On the other hand, since the centre UE of the micro cell also may be scheduled in the ABS subframe, if the ABS utilization rate is very high, but there is no UE interfered by the macro station, the macro station may adjust the ABS pattern to zero.

TABLE 1

| IE/Group Name | Presence | Range | IE type and reference | Semantics description |
|---|---|---|---|---|
| DL ABS status | M | | INTEGER (0 . . . 100) | Percentage of used ABS resources. The numerator of the percentage calculation consists of resource blocks within the ABS indicated in the Usable ABS Pattern Info IE allocated by the eNB2 for UEs needing protection by ABS from inter-cell interference for DL scheduling, or allocated by the eNB2 for other reasons (e.g. some control channels). The denominator of the percentage calculation is the total quantity of resource blocks within the ABS indicated in the Usable ABS Pattern Info IE. |
| Number of DL Edge User | | 0 | INTEGER (0 . . . 200) | Number of DL Edge User |
| CHOICE Usable ABS Information | M | | — | — |
| >FDD | | | | |
| >>Usable ABS Pattern Info | M | | BIT STERING (SIZE (40)) | Each position in the bitmap represents a subframe, for which value "1" indicates 'ABS that has been designated as protected from inter-cell interference by the eNB1, and available to serve this purpose for DL scheduling in the eNB2' and value "0" is used for all other subframes. The pattern represented by the bitmap is a subset of, or the same as, the corresponding ABS Pattern Info IE conveyed in the LOAD INFORMATION message from the eNB1. |
| >TDD | | | — | — |
| >>Usable ABS Pattern Info | M | | BIT STRING (1 . . . 70) | Each position in the bitmap represents a subframe, for which value "1" indicates 'ABS that has been designated as protected from inter-cell interference by the eNB1, and available to serve this purpose for DL scheduling in the eNB2' and value "0" is used for all other subframes. The pattern represented by the bitmap is a subset of, or the same as, the corresponding |

TABLE 1-continued

| IE/Group Name | Presence | Range | IE type and reference | Semantics description |
|---|---|---|---|---|
| | | | | ABS Pattern Info IE conveyed in the LOAD INFORMATION message from the eNB1. |

This exemplary embodiment adds a field "Number of DL Edge User" in the ABS Status IE (as shown in Table 1), so that the macro station may adjust the ABS pattern in conjunction with the Number of DL Edge User information.

At Step 5, the macro cell adjusts the ABS proportion dynamically according to the information about the ABS PRB utilization rate and the number of interfered UEs of the micro cell and the PRB utilization rate of the macro cell.

Figure 8:
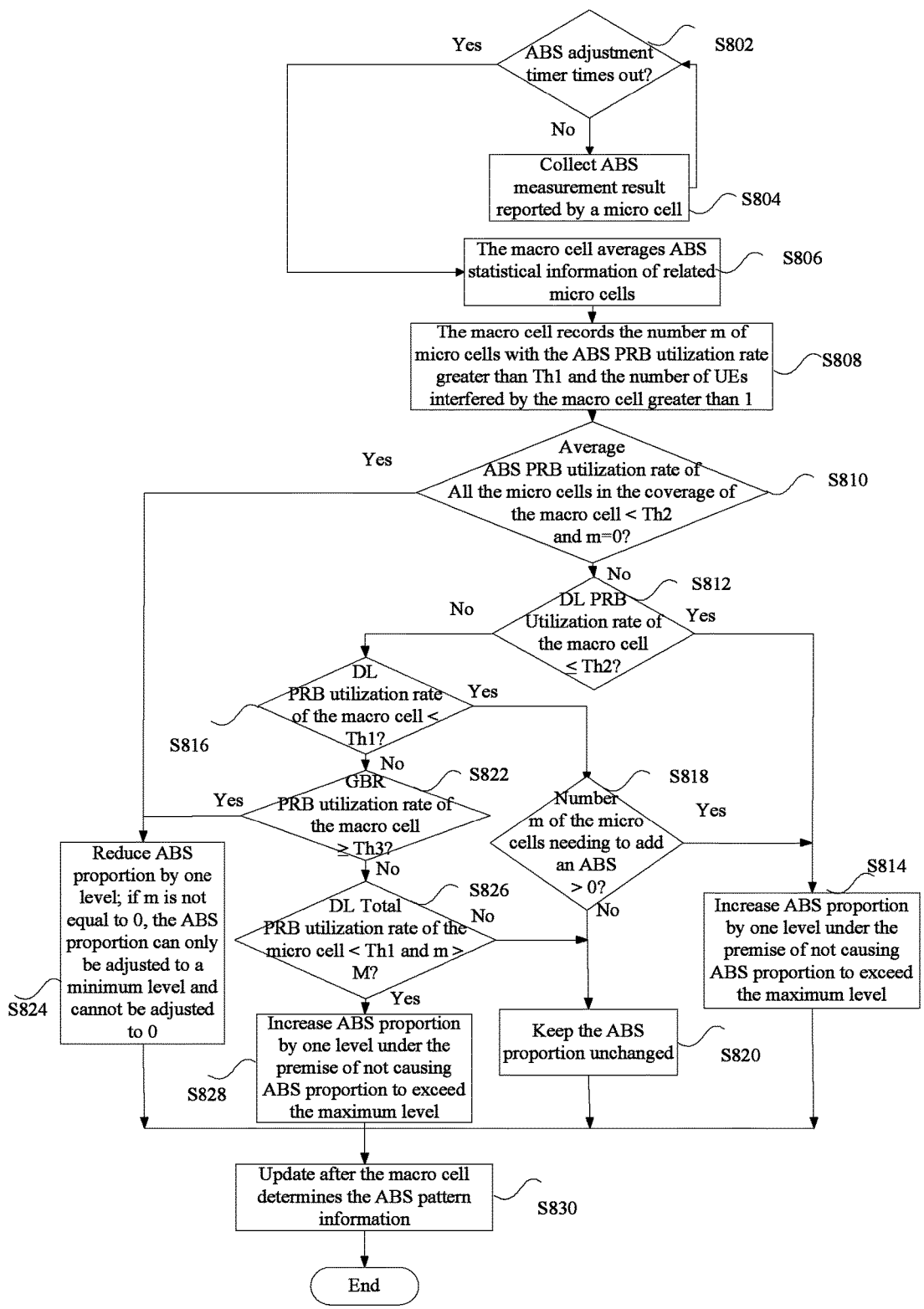
FIG. 8 is a flowchart of an ABS Pattern dynamic adjustment algorithm according to an embodiment of the present disclosure.

FIG. 8 is a flowchart of an ABS Pattern dynamic adjustment algorithm according to an embodiment of the present disclosure. As shown in FIG. 8, the process of a macro cell adjusting ABS includes steps as follows.

At step S802, whether an ABS adjustment period timer times out is judged. If the ABS adjustment period timer times out, enter step S806; otherwise, enter step S804.

At step S804, the macro cell collects an ABS measurement result reported by a micro cell.

At step S806, the macro cell collects a measurement result related to load reported by the micro cell in the coverage of the macro cell and performs statistics.

The macro cell receives an X2 interface message Resource Status Update→ABS Status→DL ABS status IE reported by the micro cell in the coverage of the macro cell, and averages the ABS PRB utilization rates and the numbers of UEs interfered by the macro cell of all the micro cells.

The macro cell receives an X2 interface message Resource Status Update→Radio Resource Status IE reported by the micro cell in the coverage of the macro cell, and averages the DL total PRBs of all the micro cells.

At step S808, statistics is gathered on the GBR (including PBR) PRB utilization rate and the DL PRB utilization rate of the macro cell.

If the average ABS PRB utilization rate of the micro cell in the coverage of the macro cell is greater than Th1 and the number of the interfered UEs is greater than 1, the macro cell considers that this micro cell needs to add an ABS subframe, and the macro cell calculates the number of the micro cells needing to add an ABS subframe and marks the number as m.

At step S810, whether the average ABS PRB utilization rate of all the micro cells in the coverage of the macro cell is less than Th2 and m=0 is judged. If the average ABS PRB utilization rate of all the micro cells in the coverage of the macro cell is less than Th2 and m=0, execute S824, that is, the ABS proportion in the ABS pattern period is reduced by one level until to zero, then go to step S830; otherwise, execute step S812.

At step S812, the macro cell adjusts the ABS subframe configuration according to the statistical information of the macro cell and the average statistical information of all micro cells in the coverage of the macro cell.

Whether the DL PRB utilization rate of the macro cell is not greater than Th2 is judged. If the DL PRB utilization rate of the macro cell is not greater than Th2, execute step S814; otherwise, execute step S816.

At step S814, the ABS proportion in the ABS pattern period is increased by one level under the premise of not exceeding the maximum level.

At step S816, whether the DL PRB utilization rate of the macro cell is less than Th1 is judged. If the DL PRB utilization rate of the macro cell is less than Th1, execute step S818; otherwise, execute step S822.

At step S818, in the condition that the DL PRB utilization rate of the macro cell is less than Th1 but greater than Th2, it is judged whether the number m of the micro cells needing to add an ABS is greater than 0, if the number m of the micro cells needing to add an ABS is greater than 0, execute step S814; otherwise, execute step S820.

At step S820, the ABS proportion is kept unchanged.

At step S822, whether the GBR (including PBR) PRB utilization rate of the macro cell is not less than Th3 is judged. If the GBR (including PBR) PRB utilization rate of the macro cell is not less than Th3, execute step S824; otherwise, execute step S826.

At step S824, the ABS proportion is reduced by one level; if m is not equal to 0, the ABS proportion can only be adjusted to the minimum level, and cannot be adjusted to 0, then execute step S830.

At step S826, whether the average DL Total PRB utilization rate of the micro cell is greater than Th1 or whether the number m of the micro cells needing to add an ABS is greater than M is judged. If the average DL Total PRB utilization rate of the micro cell is greater than Th1 or the number m of the micro cells needing to add an ABS is greater than M, execute step S828; otherwise, execute step S820.

At step S828, the ABS proportion in the ABS pattern period is increased by one level.

When the macro cell judges that the ABS proportion needs to be reduced by one level, if the proportion is already the saved minimum level, the ABS pattern status is kept unchanged.

When the macro cell judges that the ABS proportion needs to be increased by one level, if the proportion is already the saved maximum level, the ABS pattern status is kept unchanged.

In other conditions, the ABS pattern status is kept unchanged.

At step S830, after the macro cell determines the ABS pattern information, the macro cell notifies the micro cell to perform update.

At Step 6, the macro cell carries an ABS pattern of the macro cell through a load information message and notifies the micro cell to change the ABS pattern.

If the ABS pattern information changes, the macro cell triggers the X2 interface, and notifies the ABS pattern to all micro cells through a load information message of the X2 interface. After the micro cell receives the ABS pattern, the micro cell updates the configured ABS pattern, and allocates the ABS subframe to the UE interfered by the macro cell preferentially. If the ABS subframe is not fully used by the UE interfered by the macro cell, the rest ABS subframe can be allocated to the centre UE of the micro cell to use.

If the ABS pattern information is not changed, no process is performed.

To sum up, through the embodiments, the problem in the related art that the ABS subframe utilization rate reported by the micro cell to the macro cell cannot truly reflect the actual ABS utilization rate can be solved. The macro cell is enabled to provide an accurate ABS proportion for micro cells in the coverage of the macro cell.

Obviously, those skilled in the art should understand that the modules or steps of the present disclosure described above can be implemented by a common computer device; the modules or steps can be integrated on a single computing device or distributed on a network composed of a plurality of computing devices; optionally, the modules or steps can be implemented by a programming code executable by a computing device, thus they can be stored in a storage medium to be executed by a computing device and executed in a different order in some cases, or manufactured into individual integrated circuit module respectively, or several of them can be manufactured into a single integrated circuit module to implement; in this way, the present disclosure is not limited to any combination of specific hardware and software.

The above are only the exemplary embodiments of the present disclosure and not intended to limit the present disclosure. For those skilled in the art, various modifications and changes can be made to the present disclosure. Any modification, equivalent substitute and improvement made within the principle of the present disclosure are intended to be included within the scope of protection of the present disclosure.

INDUSTRIAL APPLICABILITY

Based on the above technical scheme provided by the embodiments of the present disclosure, the macro cell receives the number of interfered UEs and the ABS utilization rate from a micro cell in a coverage of the macro cell; and the macro cell adjusts the ABS proportion according to load information of the macro cell, the number of the interfered UEs under the micro cell and the ABS utilization rate. The load information includes a GBR PRB utilization rate and a GBR DL PRB utilization rate, and the ABS proportion is a ratio of the number of ABSs in an ABS pattern period to the total number of downlink subframes in the ABS pattern period. The technical solution solves the problem in the related art that the ABS subframe utilization rate reported by micro cells to a macro cell cannot truly reflect the actual ABS utilization rate. The macro cell is enabled to provide an accurate ABS proportion for the micro cells in the coverage of the macro cell.

What is claimed is:

1. An Almost Blank Subframe (ABS) proportion adjustment method, comprising:
receiving, by a macro cell, a number of interfered User Equipment (UEs) and an ABS Physical Resource Block (PRB) utilization rate from a micro cell in a coverage of the macro cell, wherein the ABS PRB utilization rate is a percentage of used ABS resources; and
adjusting, by the macro cell, an ABS proportion according to load information of the macro cell, the number of the interfered UEs under the micro cell and the ABS PRB utilization rate, wherein the load information comprises a Guaranteed Bit Rate Physical Resource Block (GBR PRB) utilization rate and a Guaranteed Bit Rate Downlink Physical Resource Block (GBR DL PRB) utilization rate, and the ABS proportion is a ratio of a number of ABSs in an ABS pattern period to a total number of downlink subframes in the ABS pattern period;
wherein before adjusting, by the macro cell, the ABS proportion according to the load information of the macro cell, the number of the interfered UEs and the ABS PRB utilization rate, the ABS proportion adjustment method further comprises:
receiving, by the macro cell, an invoke indication request sent by the micro cell;
judging, by the macro cell, whether the invoke indication request is received for the first time;
when the invoke indication request is received for the first time, sending, by the macro cell, a preconfigured initial value of the ABS proportion to the micro cell; and
when the invoke indication request is not received for the first time, sending, by the macro cell, a minimum value of the ABS proportion to the micro cell, wherein the minimum value of the ABS proportion is not equal to 0.

2. The ABS proportion adjustment method as claimed in claim 1, wherein adjusting, by the macro cell, the ABS proportion according to the load information of the macro cell, the number of the interfered UEs and the ABS PRB utilization rate comprises:
averaging ABS PRB utilization rates and numbers of interfered UEs of all micro cells in the coverage of the macro cell to obtain an average ABS PRB utilization rate of all the micro cells;
when the average ABS PRB utilization rate of all the micro cells is greater than a first threshold and the number of the interfered UEs is greater than 1, increasing the ABS proportion and recording a number M of micro cells for which ABS needs to be added, by the macro cell;
when the average ABS PRB utilization rate of all the micro cells is not greater than a second threshold, judging whether M is equal to 0; when M is equal to 0, adjusting, by the macro cell, the ABS proportion to 0; when M is not equal to 0 and the GBR DL PRB utilization rate of the macro cell is not greater than the second threshold, increasing, by the macro cell, the ABS proportion; and, when M is not equal to 0 and the GBR DL PRB utilization rate of the macro cell is greater than the second threshold and is less than the first threshold, increasing, by the macro cell, the ABS proportion; and
when the GBR DL PRB utilization rate of the macro cell is not less than the first threshold, and the GBR DL PRB utilization rate of the macro cell is less than a third threshold or the M is greater than a preset threshold, increasing, by the macro cell, the ABS proportion.

3. The ABS proportion adjustment method as claimed in claim 2, wherein
when the macro cell judges that the ABS proportion needs to be reduced by one level and the ABS proportion is already a saved minimum level, an ABS pattern status is kept unchanged; and/or,
when the macro cell judges that the ABS proportion needs to be increased by one level and the proportion is already a saved maximum level, the ABS pattern status is kept unchanged.

4. A storage medium, in which a programming code is stored, wherein the programming code, when being executed by a computing device, causes the computing device to execute the method as claimed in claim 2.

5. The ABS proportion adjustment method as claimed in claim 1, wherein receiving, by the macro cell, the number of the interfered UEs and the ABS PRB utilization rate from the micro cell in the coverage of the macro cell comprises:

receiving, by the macro cell, the ABS PRB utilization rate and the number of the interfered UEs through a resource status update message.

6. The ABS proportion adjustment method as claimed in claim 5, wherein before receiving, by the macro cell, the ABS PRB utilization rate and the number of the interfered UEs through a resource status update message, the method further comprises:

sending, by the macro cell, a resource status request message to the micro cell to request for the number of the interfered UEs and the ABS PRB utilization rate;

receiving, by the macro cell, a resource status response message replied by the micro cell.

7. A storage medium, in which a programming code is stored, wherein the programming code, when being executed by a computing device, causes the computing device to execute the method as claimed in claim 5.

8. The ABS proportion adjustment method as claimed in claim 1, wherein after adjusting, by the macro cell, the ABS proportion according to the load information of the macro cell, the number of the interfered UEs under the micro cell and the ABS PRB utilization rate, the ABS proportion adjustment method further comprises:

sending, by the macro cell, a load message to the micro cell, wherein the load message carries an ABS pattern of the macro cell, and the ABS pattern is indicative of the ABS proportion.

9. A storage medium, in which a programming code is stored, wherein the programming code, when being executed by a computing device, causes the computing device to execute the method as claimed in claim 8.

10. The ABS proportion adjustment method as claimed in claim 1, receiving, by the macro cell, the number of interfered UEs and the ABS PRB utilization rate from the micro cell in the coverage of the macro cell comprises:

receiving, by the macro cell, the number of interfered UEs and the ABS PRB utilization rate which are periodically reported by the micro cell.

11. The ABS proportion adjustment method as claimed in claim 1, wherein the macro cell is a Macro evolved NodeB (MeNB), and the micro cell comprises any one of pico evolved NodeB (PeNB) and femto evolved NodeB (HeNB).

12. A storage medium, in which a programming code is stored, wherein the programming code, when being executed by a computing device, causes the computing device to execute the method as claimed in claim 1.

13. An Almost Blank Subframe (ABS) proportion adjustment device, applied to a macro cell, the ABS proportion adjustment device comprising a hardware processor arranged to execute the following program modules:

a first receiving module, arranged to receive a number of interfered User Equipment (UEs) and an ABS Physical Resource Block (PRB) utilization rate from a micro cell in a coverage of the macro cell, wherein the ABS PRB utilization rate is a percentage of used ABS resources;

an adjustment module, arranged to adjust an ABS proportion according to load information of the macro cell, the number of the interfered UEs under the micro cell and the ABS PRB utilization rate, wherein the load information comprises a Guaranteed Bit Rate Physical Resource Block (GBR PRB) utilization rate and a Guaranteed Bit Rate Downlink Physical Resource Block (GBR DL PRB) utilization rate, and the ABS proportion is a ratio of a number of ABSs in an ABS pattern period to a total number of downlink subframes in the ABS pattern period;

wherein the hardware processor is further arranged to execute the following program modules:

a second receiving module, arranged to receive an invoke indication request sent by the micro cell;

a judgment module, arranged to judge whether the invoke indication request is received for the first time;

a first sending module, arranged to send, when the invoke indication request is received for the first time, a preconfigured initial value of the ABS proportion to the micro cell; and a second sending module, arranged to send, when the invoke indication request is not received for the first time, a minimum value of the ABS proportion to the micro cell, wherein the minimum value of the ABS proportion is not equal to 0.

14. The ABS proportion adjustment device as claimed in claim 13, wherein the adjustment module is arranged to:

average ABS PRB utilization rates and numbers of interfered UEs of all micro cells in the coverage of the macro cell to obtain an average ABS PRB utilization rate of all the micro cells; when the average ABS PRB utilization rate of all the micro cells is greater than a first threshold and the number of the interfered UEs is greater than 1, increase the ABS proportion and record a number M of micro cells for which ABS needs to be added;

when the average ABS PRB utilization rate of all the micro cells is not greater than a second threshold, judge whether M is equal to 0; when M is equal to 0, adjust the ABS proportion to 0; when M is not equal to 0 and the GBR DL PRB utilization rate of the macro cell is not greater than the second threshold, increase the ABS proportion; and, when M is not equal to 0 and the GBR DL PRB utilization rate of the macro cell is greater than the second threshold and is less than the first threshold, increase the ABS proportion; and when the GBR DL PRB utilization rate of the macro cell is not less than the first threshold, and the GBR DL PRB utilization rate of the macro cell is less than a third threshold or the M is greater than a preset threshold, increase the ABS proportion.

15. The ABS proportion adjustment device as claimed in claim 13, wherein the first receiving module is arranged to:

receive the ABS PRB utilization rate and the number of the interfered UEs through a resource status update message.

16. The ABS proportion adjustment device as claimed in claim 13, wherein the hardware processor is further arranged to execute the following program modules:

a third sending module, arranged to send a load message to the micro cell, wherein the load message carries an ABS pattern of the macro cell, and the ABS pattern is indicative of the ABS proportion.

* * * * *